US011479951B2

(12) United States Patent
Fuchs et al.

(10) Patent No.: US 11,479,951 B2
(45) Date of Patent: Oct. 25, 2022

(54) DEVICE AND METHOD FOR LOW ENERGY ATMOSPHERIC WATER GENERATION

(71) Applicant: Beth-El Zikhron Yaaqov Industries Ltd., Zikhron Yaaqov (IL)

(72) Inventors: Albrecht Michael Fuchs, Zikhron Yaaqov (IL); Karl-Hans Dietrich Fuchs, Zikhron Yaaqov (IL); Jonathan Schneider, Zikhron Yaaqov (IL)

(73) Assignee: BETH-EL ZIKHRON YAAQOV INDUSTRIES LTD., Zikhron Yaaqov (IL)

( * ) Notice: Subject to any disclaimer, the term of this patent is extended or adjusted under 35 U.S.C. 154(b) by 266 days.

(21) Appl. No.: 16/647,026

(22) PCT Filed: Sep. 21, 2017

(86) PCT No.: PCT/IB2017/055718
§ 371 (c)(1),
(2) Date: Mar. 13, 2020

(87) PCT Pub. No.: WO2019/058158
PCT Pub. Date: Mar. 28, 2019

(65) Prior Publication Data
US 2020/0316514 A1  Oct. 8, 2020

(51) Int. Cl.
*E03B 3/28* (2006.01)
*B01D 53/04* (2006.01)
*B01D 5/00* (2006.01)
*B01D 53/26* (2006.01)

(52) U.S. Cl.
CPC ............... *E03B 3/28* (2013.01); *B01D 5/006* (2013.01); *B01D 5/0012* (2013.01);
(Continued)

(58) Field of Classification Search
CPC .... B01D 53/02; B01D 53/04; B01D 53/0407; B01D 53/0438; B01D 53/0462;
(Continued)

(56) References Cited

U.S. PATENT DOCUMENTS

| 4,793,143 A | 12/1988 | Rhodes |
| 6,336,957 B1 | 1/2002 | Tsymerman |

(Continued)

FOREIGN PATENT DOCUMENTS

| WO | 03025295 | 3/2003 |
| WO | 2015005791 | 1/2015 |

(Continued)

OTHER PUBLICATIONS

International Search Report, International Application No. PCT/IB2017/055718, dated Jun. 20, 2018.
(Continued)

*Primary Examiner* — Gabriel E Gitman
(74) *Attorney, Agent, or Firm* — The Roy Gross Law Firm, LLC; Roy Gross (57) ABSTRACT

According to the present invention there is provided a device and method for atmospheric water harvesting operative in an alternating sequence of an absorption phase and a desorption phase. The device comprises an air permeable adsorbent substrate being subject to an atmospheric airflow during the absorption phase and being subject to a circulated airflow during the desorption phase. The device further comprises a liquid heated heat radiation element embedded in the adsorbent substrate and a heated liquid heating media being circulated in the heat radiation element during the desorption phase. The device may further comprise air shutters, where the direction of the atmospheric airflow being substantially transversal to the direction of the circulated airflow. The air shutters are capable of blocking an entrance and an exit of the atmospheric airflow during the desorption phase.

17 Claims, 9 Drawing Sheets

(52) U.S. Cl.
CPC ..... *B01D 53/0407* (2013.01); *B01D 53/0438* (2013.01); *B01D 53/0462* (2013.01); *B01D 53/261* (2013.01); *B01D 53/265* (2013.01); *B01D 2253/102* (2013.01); *B01D 2253/104* (2013.01); *B01D 2253/106* (2013.01); *B01D 2253/108* (2013.01); *B01D 2253/308* (2013.01); *B01D 2257/80* (2013.01); *B01D 2259/40092* (2013.01)

(58) Field of Classification Search
CPC .. B01D 53/261; B01D 53/265; B01D 5/0012; B01D 5/006; B01D 2253/102; B01D 2253/104; B01D 2253/106; B01D 2253/108; B01D 2253/308; B01D 2257/80; B01D 2259/40092; Y02A 20/00
See application file for complete search history.

(56) References Cited

U.S. PATENT DOCUMENTS

2005/0044862 A1* 3/2005 Vetrovec ............. B01D 53/265
62/93
2009/0151368 A1 6/2009 Bar
2010/0170499 A1* 7/2010 Bar ..................... E03B 3/28
62/235.1
2010/0175557 A1 7/2010 Shih et al.
2016/0109143 A1 4/2016 Kogan et al.
2017/0354920 A1 12/2017 Switzer et al.

FOREIGN PATENT DOCUMENTS

WO   2016053162   4/2016
WO   2016081863   5/2016

OTHER PUBLICATIONS

Written Opinion of the International Searching Authority, International Application No. PCT/IB2017/055718.
International Preliminary Report on Patentability, International Application No. PCT/IB2017/055718, dated Dec. 3, 2019.

* cited by examiner

DEVICE AND METHOD FOR LOW ENERGY ATMOSPHERIC WATER GENERATION

FIELD OF THE INVENTION

The present invention relates to a device and method for low energy atmospheric water generation, more particularly to a dual phase adsorption-desorption type water from air harvester incorporating an efficient power saving cycle.

BACKGROUND OF THE INVENTION

Lack of drinking water in dry regions of earth becomes an acute problem due to increase in population and recent weather changes indicating worming of the earth climate system. Among the suggested solutions is harvesting of water out of the atmospheric air. Traditional atmospheric water generators use chillers to condense the water vapor found in the air and collect the condensed water. Those chillers require large amount of electric power in the range of 300 to 500 kWh in ideal conditions for generation of one cubic meter of water and much more in dry climates where the relative humidity in air is low. The chiller systems are ineffective below absolute humidity of 6 gram/$m^3$ of air.

A more power efficient process uses adsorbent materials also known as desiccants to adsorb humidity from the air in a first phase, followed by a desorption phase where the desiccant is heated to evaporate the collected water and immediately condense the high relative humidity vapors extracted from the heated desiccant.

The most power consuming step in the adsorption-desorption process is heating of the desiccant to evaporate the adsorbed water. Recent technologies and researches are focusing on ways to increase efficiency and reduce power consumption either by using sun light as energy source or by collecting wasted energy produced in one step of the process to be utilized in a subsequent energy consuming process step.

For example, US patent application 2009/0151368 describes a technology for extracting water from atmospheric air using the adsorption-desorption process while capturing heat formed in the desiccant material during the adsorption phase and combining the captured heat energy with other sources of energy to cool a condenser in the desorption phase. However experiments made by the present applicant shown that the gain of energy recovered by the above process is negligible since the required airflow through the adsorption bed is large enough to dissipate the majority of adsorption energy.

US patent application 2010/0175557 describes a low power consumption desorption apparatus, which utilizes a rotational desiccant wheel and a pair of electrodes coupled to the adsorbing material to provide an electric current flowing through the adsorbing material so as to desorb the water adsorbed within the adsorbing material. The desorption apparatus is claimed to enhance the desorption efficiency and reduce power consumption during desorption. However directly heating the desiccant by providing an electric current may only save the heat conversion losses compared to air heating systems. The heat conversion losses are typically small, hence the power saving is negligible.

PCT patent application WO 2016/081863 discloses a system using the adsorption-desorption process with a process controller configured to optimize liquid water production based on measurements of ambient air temperature, ambient air relative humidity and level of solar radiation. The main adsorption-desorption process is traditional hence power saving is achieved only by optimization of the process timing which is not significant.

PCT patent application WO 2015/005791 also published as US patent application 2016/0109143 describes a device for removing moisture from ambient air, the device being configured to operate alternately in an adsorption phase and a desorption phase. The device comprises a vessel comprising an entry and an exit which comprise valves allowing the exit and entry to be opened and closed. A body of adsorption material is positioned inside the vessel dividing the inside of the vessel in an upstream region and a downstream region. The device further comprises a condenser loop comprising a condenser located outside the vessel, a branch conduit which extends from the vessel to the condenser and which allows a branch flow of air or gas to flow from the downstream region to the condenser, and a condenser return conduit which extends from the condenser to the vessel and which allows the branch flow to return from the condenser to the upstream region of the vessel. The device further comprises at least one main return conduit for returning a main return flow of air or gas from the downstream region to the upstream region while bypassing the condenser.

The above mentioned WO 2015/005791 uses a small amount of electrical energy needed only to power air transport fans, control the system and operate valves and pumps. The thermal energy needed to evaporate the water in the desorption phase can be received from industrial waste or solar energy. This allows utilization of the technology to harvest water from air in an economical and environmentally friendly way.

However, The above mentioned WO 2015/005791 uses heated air for the transport of energy to the adsorbent in the desorption phase. For energy saving reasons the heated air is circulated in a closed loop passing through the adsorbent and the heating source several times. A partial flow is branched off out of the heated air loop gaining high humidity, for condensation and water harvesting purposes. The cooling media used for condensation is ambient air, consequently all heat energy generated for desorption is lost to the environment during condensation and cannot be further used for the heat consuming desorption process.

U.S. Pat. No. 6,336,957 discloses a method and apparatus for extracting water from atmospheric air. The apparatus comprising: (a) an enclosure having first and second areas and adapted to be alternatively open to atmospheric air and hermetically sealed from atmospheric air; (b) a sorbent material, adapted to adsorb or adsorb moister from the air, disposed within the first area and a condenser mounted within the second area; (c) means for drawing ambient air across the sorbent material when enclosure is open to atmospheric air; (d) means for alternately cooling and heating the sorbent material; (e) means for creating a partial vacuum within the enclosure and a pressure differential between the first and second areas; and (f) a water collector adapted to collect the water that condenses on the condenser, said apparatus is characterized by having means for creating a partial vacuum within the enclosure, said mean is a pressure-sensitive valve which opens when the internal pressure of the enclosure exceeds a predetermined threshold.

However prior art systems that circulates air during the desorption phase, use the same air blower for adsorption and desorption. Due to the different airflow requirements of both processes and lack of optimal airflow conditions in the desorption phase efficiency is reduced.

Accordingly there is a need to further optimize the above prior art system in order to decrease the power consumption required for the desorption phase of the process.

SUMMARY OF THE INVENTION

Accordingly, it is a principal object of the present invention to overcome the disadvantages and limitations of prior art systems and provide a device and method for low energy atmospheric water generation keeping the low values of electrical energy consumption as taught in prior art, while reducing the amount of consumed thermal energy by regaining some of the heat energy dissipated during condensation and use it in the water harvesting process further.

According to the present invention there is provided a device for atmospheric water harvesting operative in an alternating sequence of an adsorption phase and a desorption phase. The device comprises an air permeable adsorbent substrate being subject to an atmospheric airflow during the adsorption phase and being subject to a circulated airflow during the desorption phase. The device is characterized by a liquid heated heat radiation element embedded in the adsorbent substrate and a heated liquid heating media being circulated in the heat radiation element during the desorption phase.

According to an aspect of the invention, the device further comprises air shutters. The direction of the above atmospheric airflow being substantially transverse to the direction of the above circulated airflow. The air shutters are capable of blocking an entrance and an exit of the atmospheric airflow during the desorption phase.

Additionally, according to the present invention a method is provided for atmospheric water harvesting operative in an alternating sequence of an adsorption phase and a desorption phase, comprising one or more of the steps of:
a) providing a device comprising an air permeable adsorbent substrate and a liquid heated heat radiation element embedded in the adsorbent substrate;
b) providing a first airflow entering through a largest face of the adsorbent substrate;
c) blocking an entrance and exit of the first airflow;
d) heating the adsorbent substrate by a liquid heating media circulated through the heat radiation element;
e) providing a closed loop transversal second airflow entering through a smallest face of the adsorbent substrate;
Optionally the following steps may be further provided:
f) providing a liquid cooled condenser and liquid coolant;
g) circulating the second airflow through the liquid cooled condenser;
h) collecting water condensed in the liquid cooled condenser;
i) providing a second device; and
j) circulating the liquid coolant in the heat radiation element of the second device recovering energy from the liquid coolant.

BRIEF DESCRIPTION OF THE DRAWINGS

The invention and the way it may be carried out in practice, will be understood with reference to the following illustrative figures, by way of non-limiting example only, in which like reference numerals identify like elements, and in which.

DETAILED DESCRIPTION OF EMBODIMENTS

According to the present invention there is provided a dual phase adsorption-desorption type water from air harvester incorporating an efficient power saving cycle where transfer of energy is done through a liquid heating media flowing through a heat radiation element. The heat radiation element transfers the heat to an humidity loaded adsorbent substrate creating a rise in the temperature of the adsorbent substrate and allowing the release of adsorbed humidity in form of vapor which is condensed and collected as water. During the desorption phase, all of the desorption airflow can be condensed without losing essential energy since heating is not conveyed by the desorption air flow as done in prior art systems. Additionally energy dissipated during condensation is recovered for a subsequent desorption phase.

ASTM designation F726-99 (Standard test method for sorbent performance of adsorbents) defines as follows:
Sorbent: "An insoluble material or mixture of materials used to recover liquids through the mechanisms of Absorption or Adsorption or both."
Absorbent: "A material that picks up and retains a liquid distributed throughout its molecular structure causing the solid to swell (50% or more). The absorbent is at least 70% insoluble in excess fluid".
Adsorbent: "An insoluble material that is coated by a liquid on its surface including pores and capillaries without swelling more than 50% in excess liquid."

The adsorbent of the present invention may in some cases swallow liquids to the extent entering the definition of absorbent.

Figure 1:
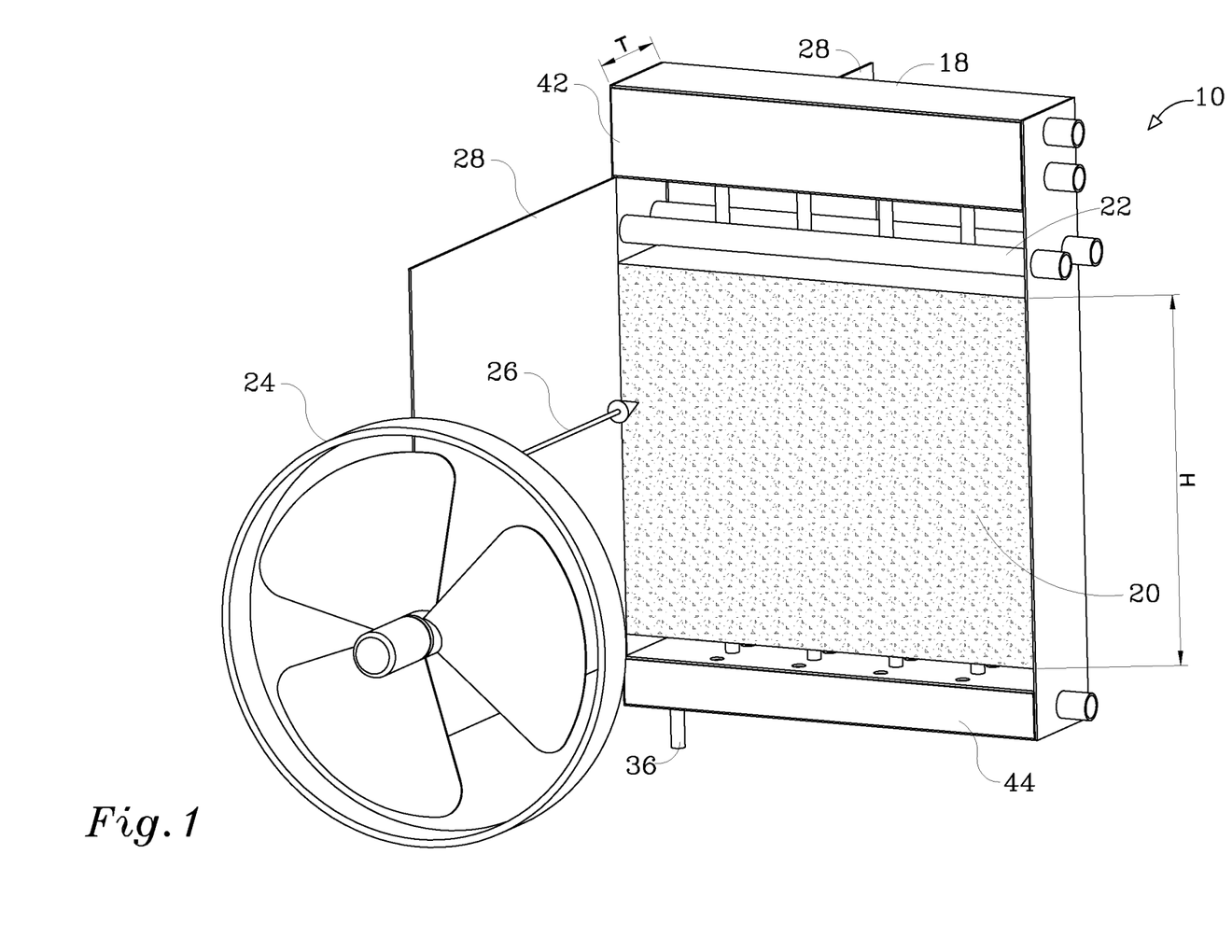
FIG. 1 is a perspective view of a device for low energy atmospheric water generation made according to an embodiment of the invention, shown in an adsorption phase.
Figure 2:
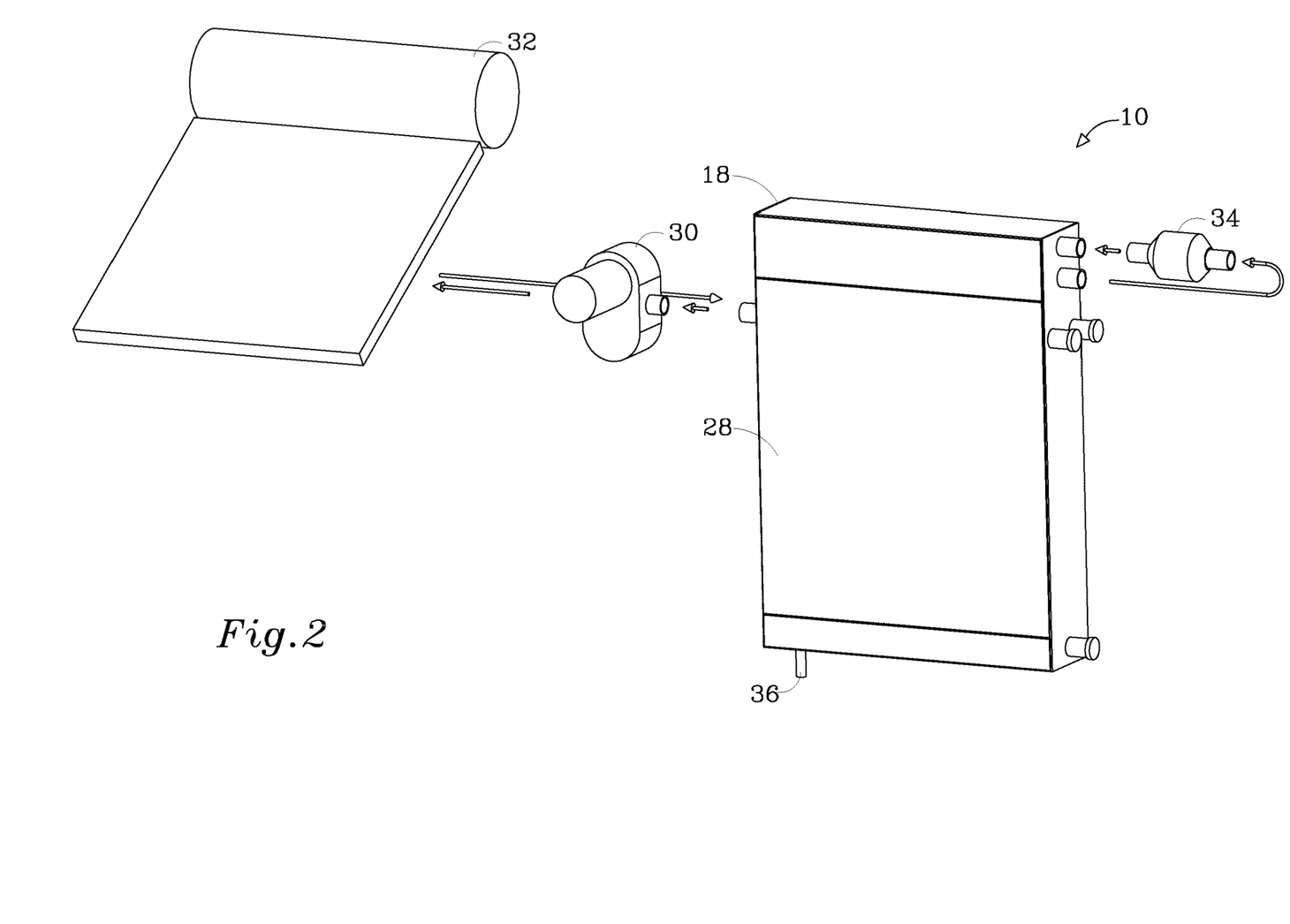
FIG. 2 is a perspective view of the device of FIG. 1, shown in a desorption phase.

With reference to the figures, according to one embodiment of the present invention, there is shown in FIG. 1, a device for atmospheric water generation or harvesting generally referenced 10, operative in an alternating sequence of an adsorption phase and a desorption phase. The device 10 comprises a housing 18, an air permeable adsorbent substrate 20 located within the housing 18, a heat radiation element 22 (partially shown) embedded in the adsorbent substrate 20, and hinged air shutters 28 provided on both sides of the housing 18. The adsorbent substrate 20 being subject to a first flow of untreated atmospheric air, or in short, atmospheric airflow, during the adsorption phase and being subject to a second flow of a certain volume of air circulating in a loop, or in short, circulated airflow during the desorption phase, as will be explained below. The atmospheric and circulated airflows may be produced by at least one air mover such as a fan or blower. The device 10 being operative in a repetitive sequence of an adsorption phase as shown in FIG. 1, and a desorption phase as shown in FIG. 2. During adsorption phase the air shutters 28 are open and an external air mover such as fan 24 produces an atmospheric airflow typically horizontal, marked by arrow 26 through the largest face of the air permeable adsorbent substrate 20. With reference to FIG. 2, during operation in desorption phase the air shutters 28 are closed blocking an entrance and an exit of the atmospheric horizontal airflow 26 such that the internal space of housing 18 is closed. A liquid heat media pump 30 circulates liquid media heated by an external heat source such as solar collector 32, an electric heater, industrial waste or any other heat source, into the heat radiation element 22 (FIG. 1) of the device 10. A relatively small air blower 34 circulates air in a closed loop within the device 10 as will be hereinafter explained. Water generated during the desorption phase are delivered through drain pipe 36.

Figure 3:
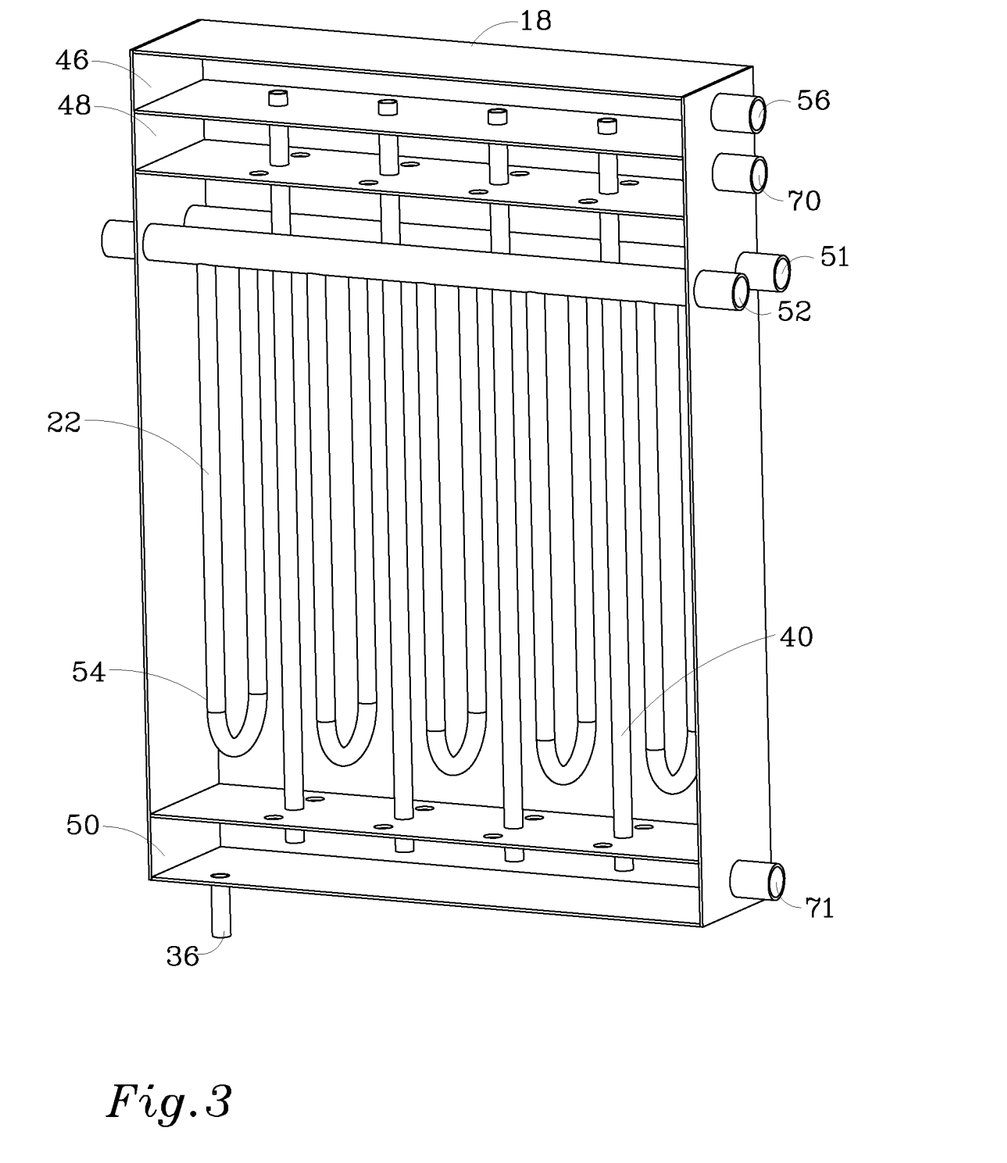
FIG. 3 is a perspective view of the device of FIG. 1, shown without some elements for clarity.

With reference to FIG. 3, the device 10 is shown without the air shutters 28 and without the adsorbent substrate 20, which is removed to expose the heat radiation element 22 and condensation tubes 40, also embedded in the adsorbent substrate 20 for the purpose of vapor condensation during the desorption phase. A fixed top cover 42 and a bottom cover 44 (FIG. 1) are also removed to expose air entrance chamber 46, air exit chamber 48 and water collection chamber 50 related to the desorption phase as will be hereinafter explained. The air entrance chamber 46 is provided with inlet 56 and the air exit chamber 48 is provided with outlet 70. The water collection chamber 50 is provided with port 71 which may be used alternately as inlet and outlet in conjunction with another device as will be hereafter explained with reference to FIG. 5. A plurality of condensation tubes 40 are fluidly connecting the entrance chamber 46 and water collection chamber 50.

The heat radiation element 22 is configured by way of example as a manifold comprising a transversal distribution pipe 51, transversal collection pipe 52 and plurality of longitudinal loops of heating tubes 54 fluidly connected between the distribution pipe 51 and collection pipe 52. It will be understood that the heating tubes 54 can accept different shapes and sizes, for example the heating tubes may be provided with fins (not shown) being in direct contact with said adsorbent substrate to allow rapid heat transfer to said adsorbent substrate. The fins may be provided externally, radially oriented and axially extending along said heating tubes. The fins and the heating tubes could be separate components made for example by extrusion of similar or different materials fitted to each other along a surface of a sufficient heat conducting area. Optionally, the heat radiation element may further comprise condensation tubes 40 which are provided with inner radially oriented fins 110 (FIG. 9) extending along the condensation tubes 40. A plurality of the heating tubes 54 and the condensation tubes 40 may be produced as a single unit by extrusion of a heat conducting material as will be described herein below with reference to FIGS. 7 to 9. Preferred materials for the heat radiation element are thermal conducting metals such as copper and aluminum.

Figure 4:
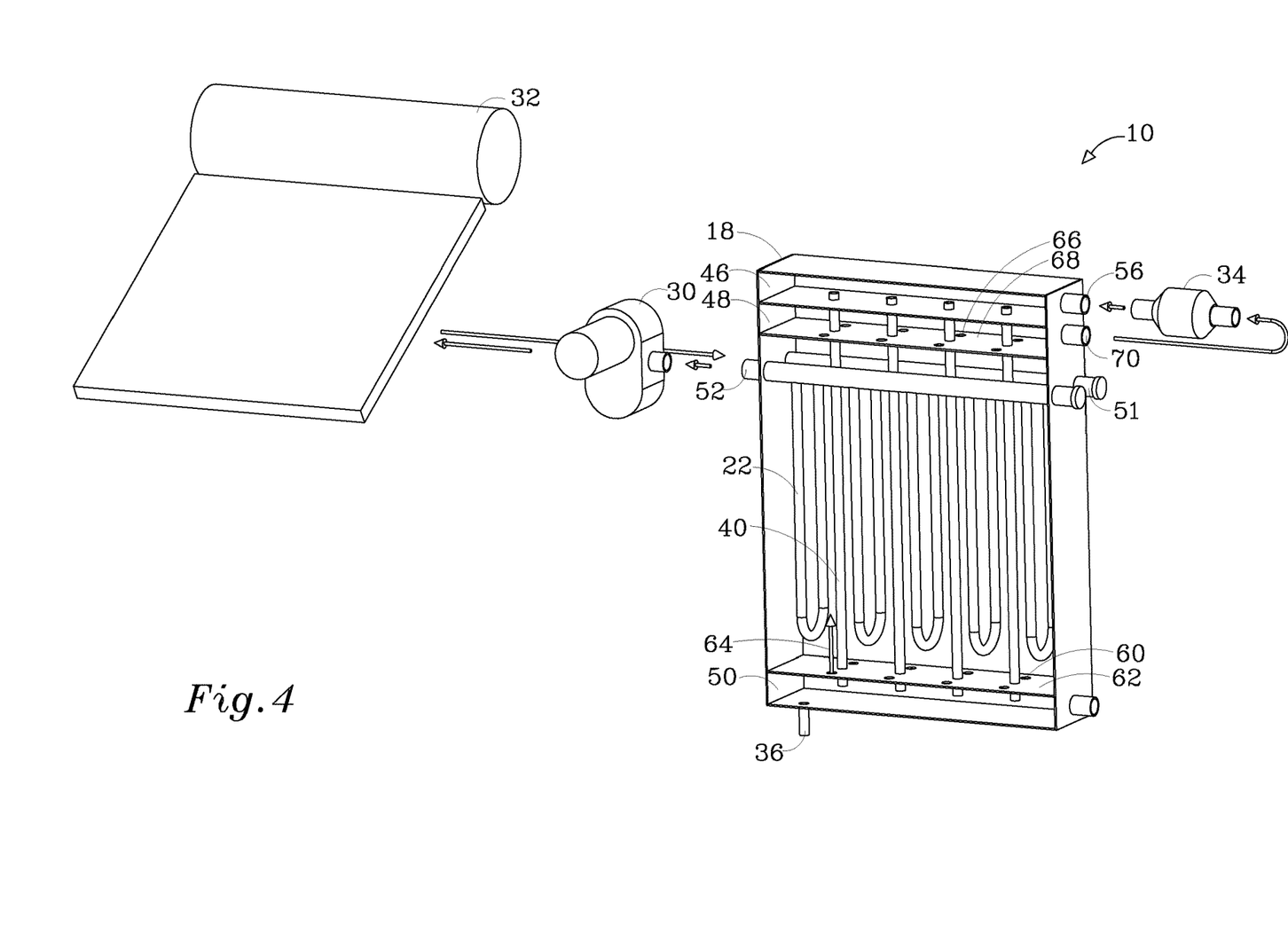
FIG. 4 is a perspective view of the device as shown in FIG. 2, with some elements removed for clarity.

With reference to FIG. 4, the device 10 is shown in the desorption phase. The air shutters 28 (FIG. 2), which are closed during desorption, are removed for clarity. The adsorbent substrate 20 (FIG. 1), is also removed exposing the heat radiation element 22 and condensation tubes 40. During the desorption phase, a preferably closed loop airflow is recirculated by relatively small blower 34 through condensation loop inlet 56, entrance chamber 46, through condensation tubes 40 to the water collection chamber 50. The air which lost water by condensation is recirculated through perforations 60 of a lower separator 62, vertically into the adsorbent substrate 20 (not shown in FIG. 4) as marked by arrow 64, then through perforations 66 of an upper separator 68, into air exit chamber 48 and back through outlet 70 to blower 34.

As mentioned above with reference to FIG. 2, during the desorption phase a liquid heat media heated for example by solar collector 32, is circulates by pump 30 into the heat radiation element 22 of the device 10. The heated liquid enters the transversal distribution pipe 51, through longitudinal loops of heating tubes 54, which are embedded in the adsorbent substrate 20 (FIG. 1), to transversal collection pipe 52 and back to the solar collector 32. The water collected in the adsorbent substrate 20 during the adsorption phase are heated up by the liquid heat media and evaporated during the desorption phase to the closed loop air flow circulation. The water then condensates in the condensation tubes 40 of the same device 10, such that desorption and condensation are performed on a single device. The condensed water may be collected through water drain 36.

Figure 5:
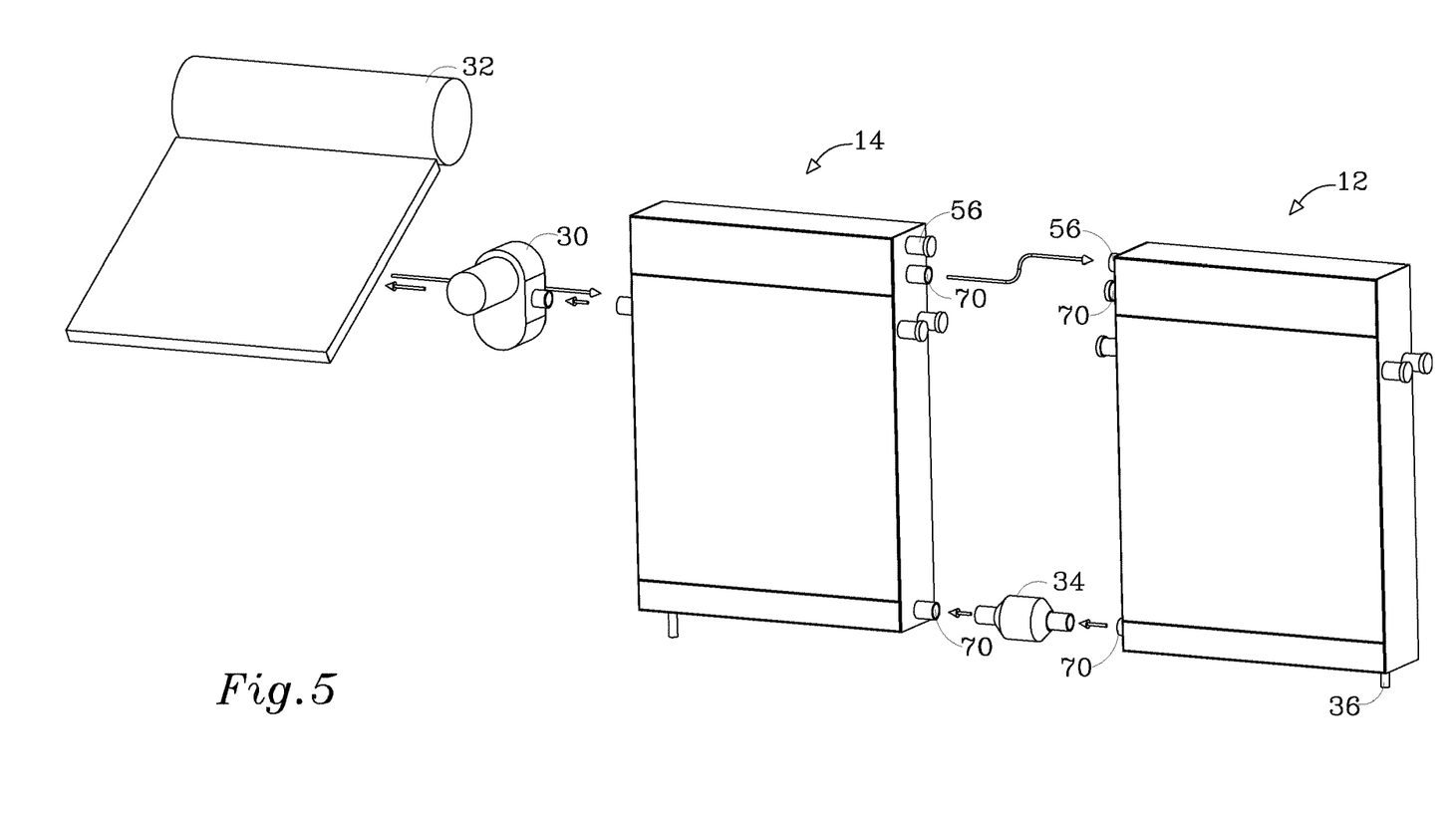
FIG. 5 is a perspective view of an embodiment of the invention making use of two devices.

With reference to FIG. 5, there is shown another embodiment of the present invention, where two devices generally referenced 12 and 14 are jointly used in the desorption phase. In contrast to the above embodiment where the desorption and condensation took place on a single device 10, here a first device 14 is heated as described above with reference to FIG. 4 but the condensation is taking place in a second device 12 which has completed the adsorption phase and is relatively cool. Accordingly, the desorption is performed on a first device 14 and condensation is performed on a second device 12.

As shown in FIG. 5, airflow is circulated between the first and the second devices 14 and 12 respectively, by blower 34. Air enters through port 70 of first device 14 to the water collection chamber 50 (FIG. 3), through the adsorbent substrate 20, air exit chamber 48 and outlet 70 of first device 14. Since first device 14 is heated, the air collects water vapor and transmit it to the inlet 56 of second device 12. In second device 12, the circulated air is flowing from air entrance chamber 46, through condensation tubes 40 (FIG. 3) to the water collection chamber 50. The water vapors are condensates and water is collected from drain 36 of second device 12. The condensation process releases heat energy into the adsorbent substrate of second device 12 thus recovering the dissipated heat and raising the adsorbent substrate temperature to a point where minimal additional heat energy is needed to start the desorption phase of the second device 12. During the above described process there is no fluid heating of the second device 12. It will be understood that significant amount of energy that would have been wasted in prior art air heating systems, is gained back by the usage of fluid heating and full flow circulation of the air in the desorption phase.

Common to both above embodiments described with reference to FIG. 4 and FIG. 5, is that water condensation during desorption phase is made in condensation tubes 40, being in large surface area of contact with the adsorbent substrate 20, thus heat energy radiated by the condensation tubes 40 during the desorption phase is recovered into the adsorbent substrate 20 for a subsequent desorption phase.

Figure 6:
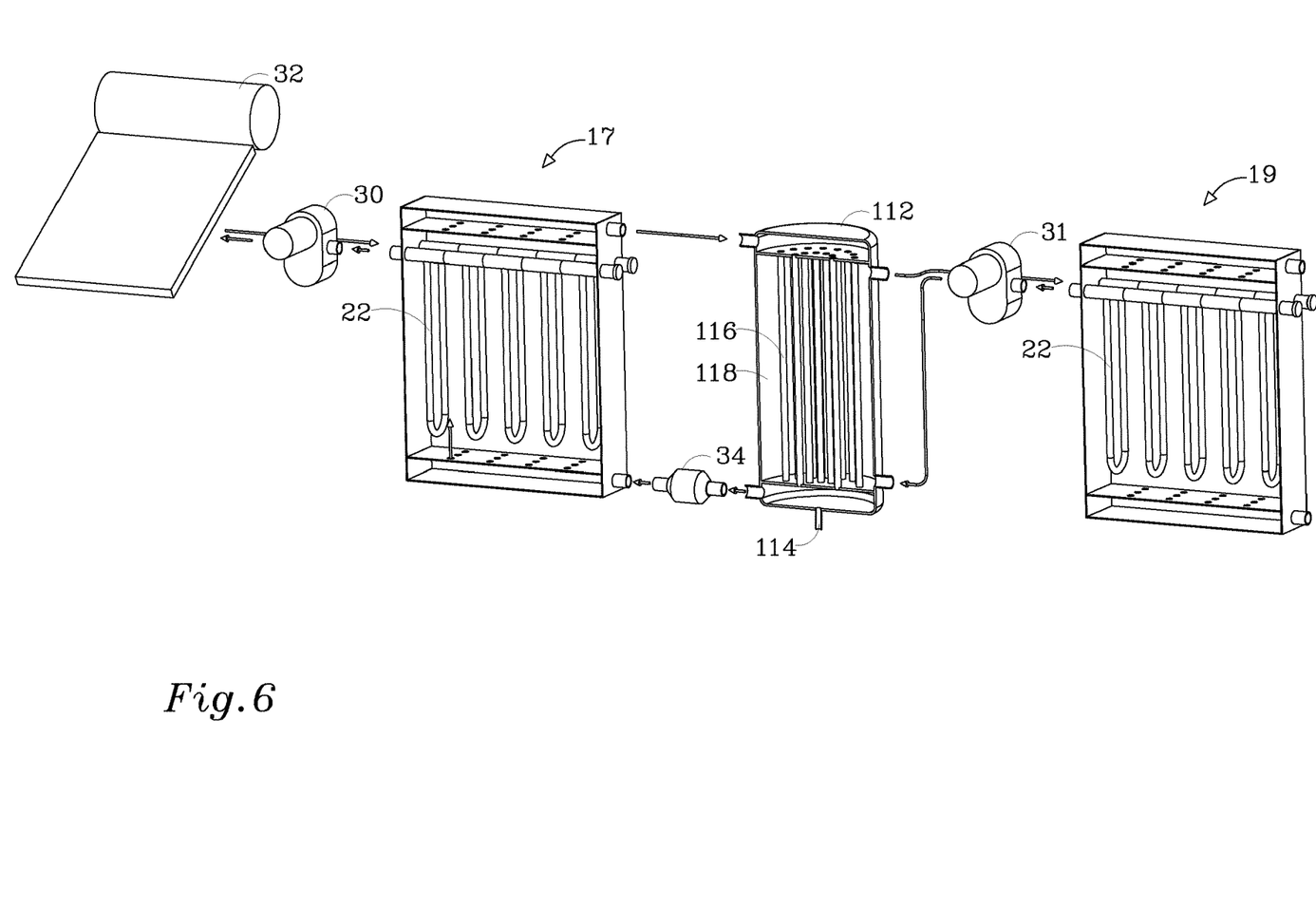
FIG. 6 is a perspective view of an embodiment of the invention making use of a separate liquid cooled condenser shown sectioned in the figure.

FIG. 6 depicts an embodiment of the invention where the device generally referenced 17 is provided with the heat radiation element 22 but without the condensation tubes 40. The device 17 is shown for clarity without the adsorbent substrate 20, covers 42, 44 and doors 28 (FIG. 1). According to this embodiment, there is no need for the air entrance chamber 46 (FIG. 3), since during the desorption phase, condensation is performed in a dedicated liquid cooled condenser 112, such as a pipe 116 and case 118 condenser for example, as shown sectioned in FIG. 6 and as known in the art. Preferably, the flow direction of the liquid coolant in the liquid cooled condenser 112 is opposite to the flow direction of the desorption phase airflow in the condensation pipes 116 of the liquid cooled condenser 112. It will be understood however that any type of air or liquid cooled condenser can be used to the same extent.

The device 17 is shown in operation during the desorption phase. A liquid heat media pump 30 circulates liquid heated for instance by a solar collector 32, an electric heater, or any other heat source, into the heat radiation element 22 of the device 17 which has completed the adsorption phase. A relatively small air blower 34 circulates air in a closed loop gathering the device 17 and the liquid cooled condenser 112. The condensation tubes 116 of the liquid cooled condenser 112 are cooled by liquid coolant circulating in chamber 118. Water generated during the desorption phase are delivered through drain pipe 114 of condenser 112.

In order to improve efficiency of the system, a second liquid cooling pump 31 circulates liquid coolant between condenser 112 and an additional similar second device generally referenced 19. The second device 19 has completed the adsorption phase and is using the heat energy transferred to the liquid coolant in the desorption phase of the first device 17 to raise the temperature of the second device 19 to a point where minimal additional heat energy is needed to start the desorption phase of the second device 19. The liquid coolant may be further cooled after circulating in second device 19 by an additional air cooled radiator (not showed).

Common to all embodiments of the present invention, is the dissimilar airflow direction through the adsorbent substrate 20 during the two phases. Atmospheric airflow direction during the desorption phase being substantially transverse to the circulated airflow direction during the adsorption phase. Typically as shown in FIGS. 1 and 4, the atmospheric airflow during the adsorption phase is substantially horizontal entering through the largest face of the adsorbent substrate 20 as marked by arrow 26 in FIG. 1, and the circulated airflow during the desorption phase is substantially vertical entering through the smallest face of the adsorbent substrate 20 as marked by arrow 64 in FIG. 4. The device 10 is preferably cuboid in shape, the circulated vertical airflow during the desorption phase flows substantially through a height of the adsorption substrate marked H in FIG. 1, and the atmospheric horizontal airflow during the adsorption phase flows substantially through a thickness of the adsorption substrate marked T in FIG. 1. According to the present invention, an optimized height to thickness ratio is achieved when the height dimension H is 5 to 20 times larger than the thickness dimension T. As mentioned above, a relatively small air blower 34 is used for the circulated airflow during the desorption phase, in terms of air velocity, an optimized velocity of the atmospheric airflow during the adsorption phase is 5 to 10 times faster than the velocity of the circulated airflow during the desorption phase.

Figure 7:
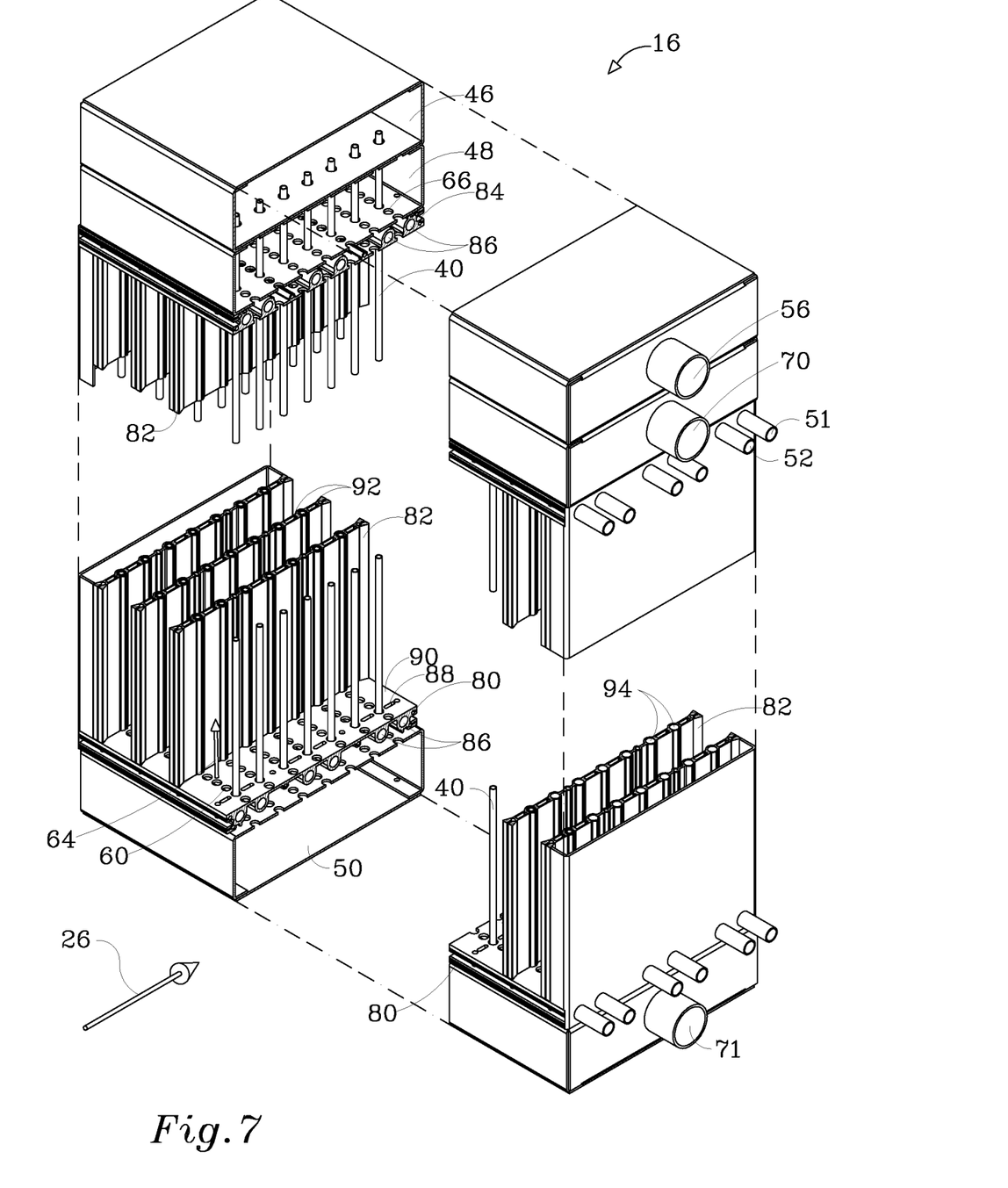
FIG. 7 is a perspective view of a device built with dedicated extruded profiles.
Figure 8:
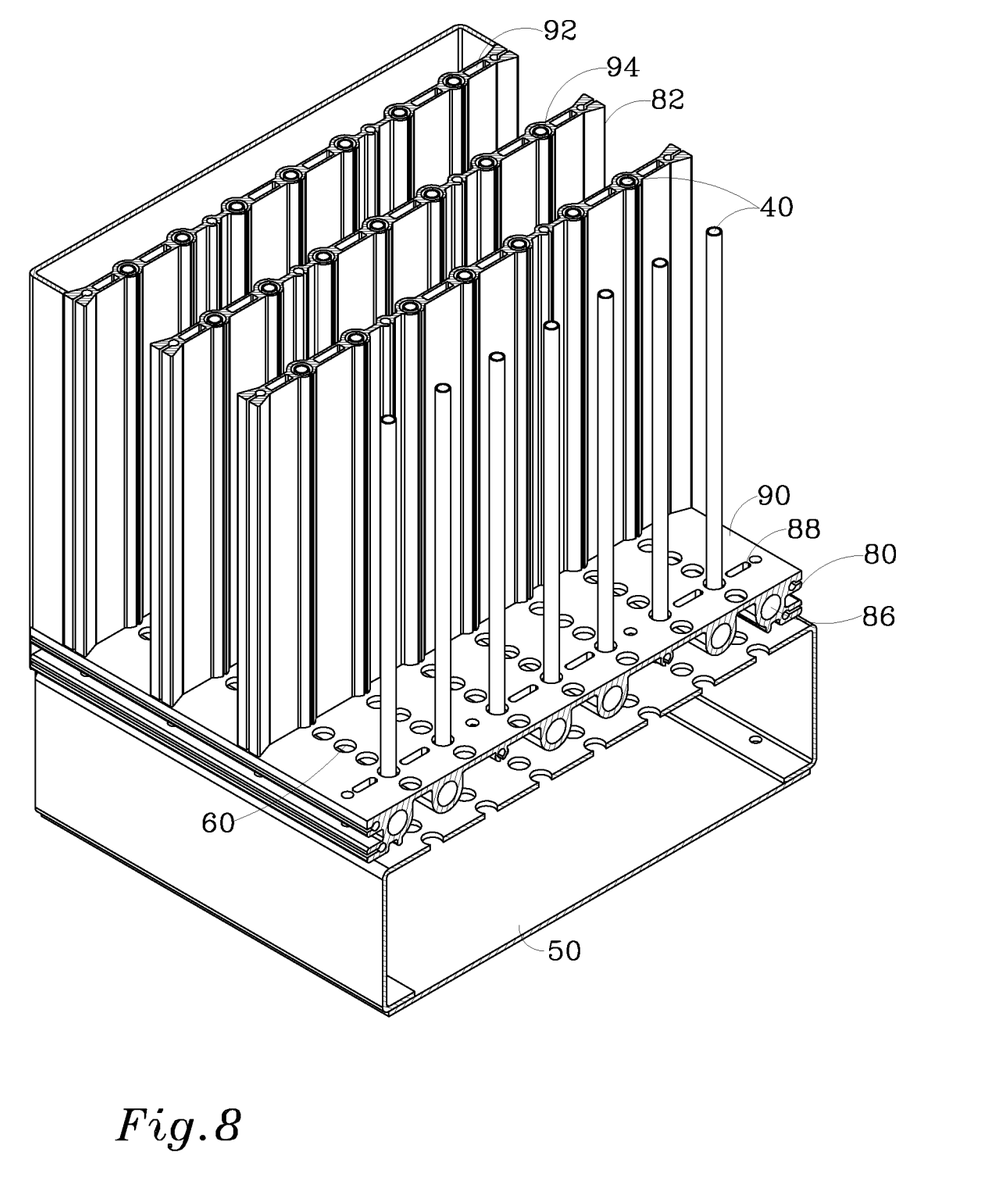
FIG. 8 is an enlarged perspective view of the bottom left corner of FIG. 7.

Referring now to FIG. 7, there is shown a device generally referenced 16, made according to an embodiment of the present invention. The device 16 is shown longitudinally and transversely sectioned with the central portion removed and the four corners brought towards each other, closer than would have been in practice. Accordingly the height and width to thickens ratio should not be scaled from the figure. The same numerals as used with reference to FIGS. 1 to 5 will be used here where the same function is obtained. FIG. 8, is an enlarged view of the bottom left corner of FIG. 7 shown with the same numerals as in FIG. 7, providing better view of the details. As shown in FIGS. 7 and 8, the heat radiation element 22 (FIG. 3), is made of dedicated extruded profiles 80 and 84 which function as an alternative to the transversal distribution pipe 51 and collection pipe 52 mentioned above with reference to FIG. 3. Dedicated extruded longitudinal profiles 82 fluidly connected between the distribution and collection profiles 80 and 84, function as an alternative to the heating tubes 54 mentioned above with reference to FIG. 3. The longitudinal profiles include conduits 92 for the fluid heating media and passages 94 for the condensation tubes 40.

The bottom transversal profile 80 has a plurality of heating fluid channels 86 and openings 88 leading from the channels 86 to the surface 90. An end face of a longitudinal profile 82 is attached with sealant to the surface 90 of profile 80 such that the heating fluid can flow into the longitudinal profile fluid conduits 92. A top transversal profile 84 which is identical to profile 80 but fitted upside down, collects the heating fluid from conduits 92 into channels 86 of the top transversal profile 84. The heating fluid is circulated in the device through fluid inlet distribution pipe 51 and fluid outlet collection pipe 52 as explained above with reference to FIG. 3. Plurality of distribution and collection pipes 51, 52 respectively can be further connected in series or parallel to form heating media fluid loops as required.

Plurality of passages 94 made in the longitudinal profiles 82 are leading the condensation tubes 40 from the air entrance chamber 46 to the water collection chamber 50 as explained above with reference to FIG. 3. The condensation tubes are longer than the longitudinal profiles 82, passing also through the transversal profiles 80, 84 and through the air exit chamber 48 to function as explained above.

In operation, the gap between the longitudinal profiles 82 is filled with adsorbent substrate 20 (FIG. 1), and the front and rear surfaces are enclosed with perforated sheets (not shown) enabling flow of atmospheric air during the adsorption phase through the largest surface of the adsorbent substrate as indicated by arrow 26. The longitudinal profiles 82 are preferably arranged in the direction of the atmospheric air flow marked by arrow 26 to allow free flow of air through the adsorbent substrate during the adsorption phase. Yet the large surface area of the longitudinal profiles 82 permit affective heat transfer into the adsorbent substrate. During the desorption phase the largest surfaces of the adsorbent substrate are closed by air shutters 28 (FIG. 1), airflow is recirculated through condensation loop inlet 56, entrance chamber 46, through condensation tubes 40 to the water collection chamber 50. The air which lost water by condensation is recirculated through perforations 60 of the bottom profile 80 into the adsorbent substrate (not shown in FIG. 7) as marked by arrow 64, then through perforations 66 of the top transversal profile 84, into air exit chamber 48 and back through outlet 70 for recirculation by blower 34 (FIG. 4). It will be understood that the enlarged surface area of the longitudinal profiles 82 greatly improve the heat dissipation of the liquid heating media during the desorption phase, hence increasing the efficiency.

Figure 9:
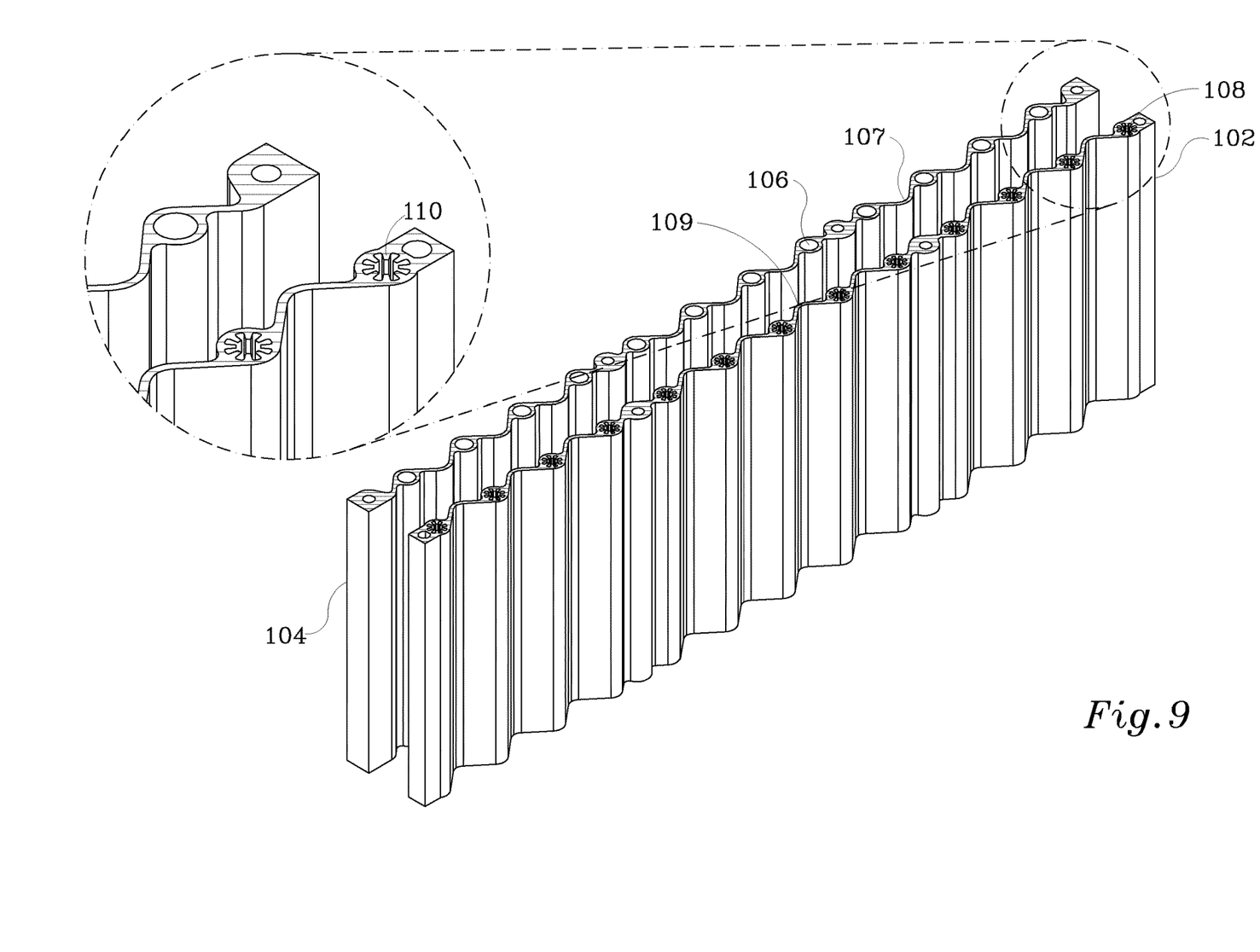
FIG. 9 is a perspective view of extruded profiles made according to an embodiment of the invention.

With reference to FIG. 9, according to another implementation of the heat radiation element 22 profiles, there are shown two types of longitudinal profiles, a condensation profile 102 and a heating media profile 104. The heating media profile 104 is provided with tubular conduits 106 for circulation of the heating media and fins 107 which are wavy curved to increase surface area and improve heat dissipation into the adsorbent substrate during the desorption phase. The condensation profile 102 has also wavy curved fins 109 but is further provided with inner radially oriented fins 110 (best viewed in the enlarged circle of FIG. 7) internally extending along the condensation airflow channel 108. The fins 110 improve the cooling and water condensation of the circulated air during the desorption phase. The two types of profiles are alternately arranged in a device such as device 16 described above with reference to FIG. 7. Two of such devices can be jointly used in the desorption phase as taught above with reference to FIG. 5, one is heating the adsorbent substrate using only heating profiles 104, and the other is cooling the airflow using only the condensation profiles 102. It will be understood that a device 16 can be made with the heating profiles 104 only, and condensation can take place in a dedicated condenser as described above with reference to FIG. 6.

According to the present invention, a plurality of such devices of any of the above embodiments may be assembled as a cluster. The atmospheric airflow during the adsorption phase may be provided to the entire cluster in parallel, while the circulated airflow during the desorption phase may be provided to the entire cluster in series. Accordingly it will be easier to evenly spread the airflow and control the airflow velocity through the individual devices gathering the cluster.

Common to all above embodiments, the adsorbent substrate 20 (FIG. 1) may comprise a nano-porous microstructure with pore sizes in the range of 0.2 to 30 nanometers, typically selected from the group of: natural or industrial zeolites; aluminas; silica gels; lithium-magnesium silicates, or blends of two or more of the above group materials. Optionally, the adsorbent substrate may comprise a porous microstructure with surface area greater than one hundred square meters per gram of adsorbent substrate, typically made of activated carbon. It will be understood that a mixture of materials comprising a nano-porous microstructure and a porous microstructure is also possible.

The present invention seeks protection regarding the device as described above, as well as the method steps taken to accomplish the desired result of low energy atmospheric water generation reducing the amount of consumed thermal energy by regaining some of the heat energy dissipated during condensation and use it in the water harvesting process further.

Accordingly a method is provided comprising one or more of the steps below:
a) providing a device comprising an air permeable adsorbent substrate and a liquid heated heat radiation element embedded in said adsorbent substrate;
b) providing a first airflow entering through a largest face of said adsorbent substrate;
c) blocking an entrance and exit of said first airflow;
d) heating said adsorbent substrate by a liquid heating media circulated through said heat radiation element; and
e) providing a closed loop transversal second airflow entering through a smallest face of said adsorbent substrate.

The method may additionally comprise the steps of:
f) providing a liquid cooled condenser and liquid coolant;
g) circulating said second airflow through said liquid cooled condenser; and
h) collecting water condensed in said liquid cooled condenser.

The method may further comprise the steps of:
i) providing a second device; and
j) circulating said liquid coolant in said heat radiation element of said second device recovering energy from said liquid coolant.

It will be appreciated that the specific embodiments of the present invention described above and illustrated in the accompanying drawings are set forth merely for purposes of example. Other variations, modifications, and applications of the present invention will readily occur to those skilled in the art. It is therefore clarified that all such variations are considered within the scope and spirit of the invention. Accordingly, the protection sought herein is as set forth in the claims below.

The invention claimed is:

1. A device for atmospheric water harvesting operative in an alternating sequence of an adsorption phase and a desorption phase, comprising:
a) an air permeable adsorbent substrate being subject to an atmospheric airflow during said adsorption phase and being subject to a closed loop circulated airflow during said desorption phase;
b) a liquid heated heat radiation element embedded in said adsorbent substrate and a heated liquid heating media being circulated in said heat radiation element during said desorption phase; and
c) air shutters capable of blocking an entrance and an exit of said atmospheric airflow, during operation in said desorption phase;
characterized by a direction of said atmospheric airflow through said adsorbent substrate being substantially transverse to a direction of said closed loop circulated airflow through said adsorbent substrate.

2. The device as claimed in claim 1, wherein said device is cuboid in shape, said closed loop circulated airflow flows through a height of said adsorbent substrate and said atmospheric airflow flows through a thickness of said adsorbent adsorption substrate, and wherein a ratio of said height to said thickness ratio is in the range of 5 to 20.

3. The device as claimed in claim 1, configured to maintain a velocity of said atmospheric airflow 5 to 10 times faster than a velocity of said closed loop circulated airflow.

4. The device as claimed in claim 1, wherein the device is one device among a plurality of such devices that are assembled as a cluster, and wherein said atmospheric airflow is provided to the entire cluster in parallel, while said closed loop circulated airflow is provided in series.

5. The device as claimed in claim 1, further comprising condensation tubes embedded in said adsorbent substrate to effect vapor condensation during said desorption phase.

6. The device as claimed in claim 5, wherein the device is one of a first device and a second device, each as claimed in claim 5, wherein the first device is configured to perform evaporation and the second device is configured to perform condensation during said desorption phase of said first device.

7. The device as claimed in claim 1, wherein a condensation of vapor during said desorption phase is performed on a dedicated liquid cooled condenser cooled by a circulation of a liquid coolant.

8. The device as claimed in claim 1, wherein said heat radiation element comprises a distribution pipe, a collection pipe and a plurality of heating tubes fluidly connected between said distribution pipe and said collection pipe.

9. The device as claimed in claim 8, wherein said heating tubes are provided with fins being in direct contact with said adsorbent substrate, wherein the fins are configured to promote heat transfer to said adsorbent substrate.

10. The device as claimed in claim 9, wherein the plurality of said heating tubes are made as a single unit by extrusion of a dedicated profile made of a heat conducting material.

11. The device as claimed in claim 6, wherein vapor condensation during said desorption phase of said first device is made in said condensation tubes of said second device, said condensation tubes being in surface contact with said adsorbent substrate, such that heat energy radiated by said condensation tubes during said desorption phase of said first device is recovered into said adsorbent substrate of said second device for the desorption phase of said second device.

12. The device as claimed in claim 7, wherein the device is one of a first device and a second device among a plurality of such devices, each as claimed in claim 7, and wherein during the desorption phase of the first device, said liquid coolant is circulated between said liquid cooled condenser and the second device which has completed said adsorption phase, said devices being configured to utilize the heat energy transferred to said liquid coolant in the desorption phase of said first device to raise the temperature of said second device such that an amount of additional heat energy needed to start the desorption phase of said second device is reduced.

13. The device as claimed in claim 1, wherein said adsorbent substrate comprises a nano-porous micro-structure having pore size in the range of 0.2 to 30 nanometers, and is made of a material selected from the group consisting of: natural or industrial zeolites; aluminas; silica gels; lithium-magnesium silicates; activated carbon, and blends of two or more of said group materials.

14. The device as claimed in claim 1, wherein said adsorbent substrate comprises a mixture of materials comprising a nano-porous micro-structure and a porous micro-structure.

15. A method for atmospheric water harvesting operative in an alternating sequence of an adsorption phase and a desorption phase, comprising the steps of:

a) providing a device comprising an air permeable adsorbent substrate and a liquid heated heat radiation element embedded in said adsorbent substrate;

b) providing a first airflow entering through a largest face of said adsorbent substrate;

c) blocking an entrance and exit of said first airflow;

d) heating said adsorbent substrate by a liquid heating media circulated through said heat radiation element; and e) providing a closed loop transverse second airflow entering through a smallest face of said adsorbent substrate.

16. The method as claimed in claim 15, further comprising the steps of:

f) providing a liquid cooled condenser and a liquid coolant;

g) circulating said second airflow through said device and said liquid cooled condenser; and h) collecting water condensed in said liquid cooled condenser.

17. The method as claimed in claim 16, further comprising the steps of:

i) providing a second device according to step a); and j) circulating said liquid coolant in said heat radiation element of said second device thus recovering energy from said liquid coolant.

* * * * *